US008759241B2

(12) United States Patent
Venkataramani

(10) Patent No.: US 8,759,241 B2
(45) Date of Patent: Jun. 24, 2014

(54) METHOD FOR MAKING A CATALYST COMPOSITION

(75) Inventor: Venkat Subramaniam Venkataramani, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 230 days.

(21) Appl. No.: 13/034,869

(22) Filed: Feb. 25, 2011

(65) Prior Publication Data

US 2012/0220447 A1    Aug. 30, 2012

(51) Int. Cl.
*B01J 37/30* (2006.01)
*B01J 27/236* (2006.01)
*B01J 23/00* (2006.01)
*B01J 23/02* (2006.01)
*B01J 23/04* (2006.01)
*B01J 23/08* (2006.01)
*B01J 23/40* (2006.01)
*B01J 23/42* (2006.01)
*B01J 23/44* (2006.01)
*B01J 23/48* (2006.01)
*B01J 23/50* (2006.01)
*B01J 23/56* (2006.01)
*B01J 21/04* (2006.01)
*C01D 1/02* (2006.01)
*C01F 7/00* (2006.01)
*C01F 7/02* (2006.01)

(52) U.S. Cl.
USPC ............. 502/11; 502/176; 502/327; 502/332; 502/333; 502/334; 502/339; 502/344; 502/348; 502/355; 502/439; 423/594.15; 423/600; 423/625; 423/628

(58) Field of Classification Search
USPC ........... 502/11, 176, 327, 332–334, 339, 344, 502/348, 355, 439; 423/594.15, 600, 625, 423/628
See application file for complete search history.

(56) References Cited

U.S. PATENT DOCUMENTS

| 3,389,975 | A | * | 6/1968 | Van Nordstrand | ............. | 423/115 |
| 3,459,502 | A | * | 8/1969 | Van Nordstrand | ............. | 423/626 |
| 4,053,579 | A | * | 10/1977 | Kato et al. | .................... | 423/630 |
| 5,286,687 | A | * | 2/1994 | Murase et al. | ................ | 501/128 |
| 5,811,362 | A | | 9/1998 | Da Silva et al. | | |
| 6,146,602 | A | | 11/2000 | Narula et al. | | |
| 7,541,310 | B2 | * | 6/2009 | Espinoza et al. | ............. | 502/326 |
| 7,582,202 | B2 | | 9/2009 | Jones et al. | | |
| 7,947,250 | B2 | * | 5/2011 | Kanazirev | ..................... | 423/625 |
| 8,007,760 | B2 | * | 8/2011 | Kanazirev | ..................... | 423/625 |
| 8,178,469 | B1 | * | 5/2012 | Lee | ............................... | 502/327 |
| 2009/0275463 | A1 | | 11/2009 | Keshavan et al. | | |

FOREIGN PATENT DOCUMENTS

EP    1832345 A1    12/2007

OTHER PUBLICATIONS

Maya Boutros, Thomas Onfroy and Patrick Da Costa; Mesostructured or Alumina-mesostructured Silica SBA-16 as Potential Support for NOx Reduction and Ethanol Oxidation; vol. 139, Nos. 1-2, 50-55.

(Continued)

*Primary Examiner* — Cam N. Nguyen
(74) *Attorney, Agent, or Firm* — Francis T. Coppa

(57) ABSTRACT

A method for making a catalyst composition suitable for various purposes, such as the reduction of nitrogen oxides, is provided. The method includes combining dawsonite or a dawsonite derivative with a catalytic active element.

24 Claims, 2 Drawing Sheets

(56) References Cited

OTHER PUBLICATIONS

Li-Qiong Wang, Christopher L. Aardahl, Kenneth G. Rappé, Diana N. Tran, Marisol A. Delgado and Craig F. Habeger; Solid-state 27Al Nuclear Magnetic Resonance Investigation of Plasma-facilitated NOx Reduction Catalysts;—Journal of Materials Research (2002), 17: 1843-1848.

Kiyoharu Tadanaga, Noriko Katata, and Tsutomu Minami; Formation Process of Super-Water-Repellent Al2O3 Coating Films with High Transparency by the Sol-Gel Method; J. Am. Ceram. Soc., 80 [12] 3213-16 (1997).

César A. Contreras, Satoshi Sugita, Esthela Ramos, Leticia M.Torres and Juan Serrato; A New Production Method of Submicron Alumina Powders; AZojomo Journal of Materials Online (ISSN 1833-122X) vol. 2 Jun. 2006; 7 Pages.

Georgiana Stoica, Johan C. Groen, Sonia Abello, Ripudaman Manchanda, and Javier Perez-Ramirez; Reconstruction of Dawsonite by Alumina Carbonation in (NH4)2CO3: Requisites and Mechanism; Chem. Mater., 2008, 20 (12), 3973-3982.

\* cited by examiner

METHOD FOR MAKING A CATALYST COMPOSITION

BACKGROUND

The invention relates generally to a method for making a catalyst composition. In particular, the invention relates to a method for making a catalyst composition useful for reactions that result in reduced emissions of nitrogen oxides.

Regulations continue to evolve regarding the reduction of the oxide gases of nitrogen (NOx) for diesel engines in trucks and locomotives, since NOx gases may be undesirable. A NOx reduction solution may include treating diesel engine exhaust with a catalyst that can reduce NOx to $N_2$ and $O_2$, using a reductant. This process may be referred to as selective catalytic reduction or SCR.

In selective catalytic reduction (SCR), a reductant, such as ammonia, is injected into the exhaust gas stream to react with NOx in contact with a catalyst. Selective catalytic reduction catalysts may include catalytic metals disposed upon a porous, high-surface area carrier support such as gamma alumina. Three general types of catalysts have been used in these systems. They include base metal systems, noble metal systems, and zeolite systems, and selection of a specific system often depends on temperatures for the underlying reactions. For example, silver-containing alumina is known for being useful for the selective catalytic reduction (SCR) of NOx, using hydrocarbon reductants.

Catalytic activity in alumina-supported catalysts usually depends on surface area, as well as on the pore size and pore volume of the alumina carrier. The effective temperature of catalytic performance favorably decreases with an increase in the surface area of the alumina carrier. However, these catalysts may not function effectively if the structure and/or efficacy of the carrier support are compromised during manufacture.

It would be desirable to develop new methods for processing high performance catalyst compositions that address some of these issues.

BRIEF DESCRIPTION

Embodiments of the invention are directed towards a method for making a catalyst composition.

According to one embodiment of the invention, a method for making a catalyst composition includes the step of combining dawsonite or a dawsonite derivative with a catalytic active element.

In one embodiment, dawsonite is first heat treated under conditions sufficient to convert the dawsonite to an amorphous alumina. The amorphous alumina is then treated in an aqueous medium at a temperature above the boiling point of the aqueous medium, so as to convert the amorphous alumina to a mesoporous alumina. A catalytic active element is combined with the mesoporous alumina to form the catalyst composition.

In another embodiment, dawsonite is first heat treated under conditions sufficient to convert the dawsonite to an amorphous alumina, followed by the combination of the amorphous alumina with a catalytic active element, to form a catalytic active element-activated amorphous alumina. The activated amorphous alumina is treated in an aqueous medium to convert the activated amorphous alumina to a catalytic active element-activated mesoporous alumina, to form a catalyst composition.

In yet another embodiment, a catalytic active element is first combined with dawsonite to form a catalytic active element-activated dawsonite. The activated dawsonite is then heat-treated, followed by treatment in an aqueous medium, to convert it to an activated mesoporous alumina, to form a catalyst composition.

DETAILED DESCRIPTION

Figure 1:
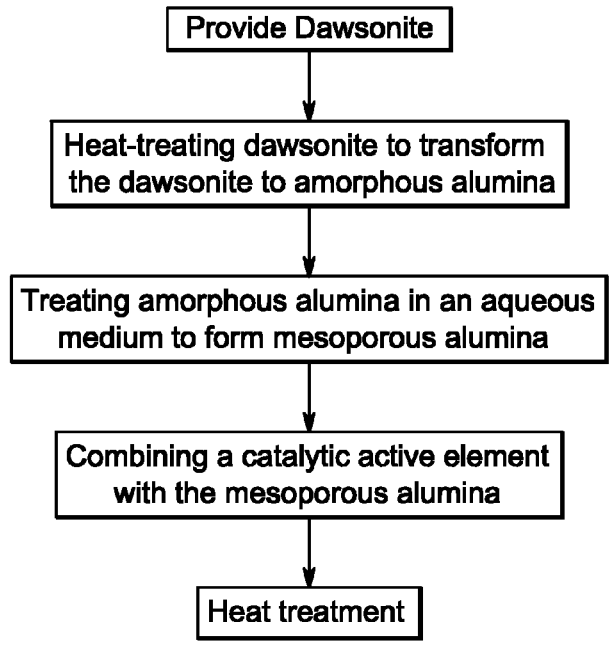
FIG. 1 is a flow diagram for making a catalyst composition, according to an embodiment of the invention.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

In the following specification and claims, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur.

As used herein, a catalyst is a substance that can cause a change in the rate of a chemical reaction without itself being consumed in the reaction. A powder is a substance including finely dispersed solid particles. A slurry is a mixture of a liquid and finely divided particles. A sol is a colloidal solution. The term "washcoat" refers to a thin coating over a core substrate forming a rough, irregular surface, which has a greater surface area than the flat core substrate.

A monolith may be a metallic or ceramic block, having a number of channels, and may be made by extrusion of a mull or a paste that is pushed through a dye to create a structure. The mull or paste is typically made up of powders of selected compositions or precursers, binders and additives, which are described later in the specification. The monolith substrate includes a honeycomb monolith, e.g. an open flow honeycomb, a wall-flow honeycomb or a honeycomb monolith body.

The methods described herein include embodiments that relate to a method for making a catalyst composition for reducing nitrogen oxides (NOx) emissions. In one embodiment, the method includes the steps of combining dawsonite or a dawsonite derivative with a catalytic active element, further described below. A natural dawsonite is a mineral composed of sodium aluminum carbonate hydroxide, and has the chemical formula $NaAlCO_3(OH)_2$. It usually exhibits an orthorhombic-dipyramidal structure. Besides $NaAlCO_3(OH)_2$ (also referred to as sodium dawsonite) a variety of compositions with a dawsonite-type structure have been synthesized, for example potassium and ammonium dawsonite. In some specific embodiments, the dawsonite may be ammonium dawsonite $NH_4AlCO_3(OH)_2$, which is often denoted as ammonium aluminum carbonate hydroxide or by the acronym AACH.

An exemplary catalyst composition comprises about 2 to about 5 weight percent of a catalytic active element, e.g. silver supported on an alumina carrier. In one embodiment, the catalytic active element is distributed on high surface area mesoporous alumina (MPA). The mesoporous alumina may comprise gamma alumina or other high temperature alumina phases. As used herein, the term "mesoporous" usually refers to a material containing pores with diameters in a range of from about 2 nanometers to about 50 nanometers.

The primary roles of the alumina carrier are to (1) provide robust support/framework at working temperature with corrosive gas and steam, and (2) to provide gas channels for NOx and a reductant, to allow contact with the catalytic active element. Therefore, the high surface area and robustness of the alumina carrier play important roles in improving catalytic activity of the catalyst composition.

In an alumina carrier, replacing some aluminum sites with other metals, for example yttrium, may result in better high temperature stability, thermal shock resistance, and hydrothermal stability. Other cations such as magnesium, zirconium, hafnium and the lanthanide rare earths can also be incorporated to help inhibit the crystal growth; and to stabilize the reactive gamma phase of the alumina. The addition of suitable additives to the alumina carrier promotes the reduction of the NOx gases in the exhaust stream in the presence of suitable reductants, such as $H_2$, diesel fuel, hydrocarbons, urea, etc. Examples of such additives may include, but are not limited to, iron, nickel, copper, cobalt, gallium, tantalum, tungsten, zinc, indium, cerium, and gadolinium.

Most of the embodiments of the present invention describe methods for forming mesoporous alumina from a dawsonite, and combining that material with the catalytic active element. In one embodiment, as illustrated in the flow chart of FIG. 1, the method first involves a heat-treatment step under conditions sufficient to calcine the dawsonite. Upon heat-treatment (also referred to as calcination) the dawsonite is transformed to an amorphous alumina. Calcination may usually be carried out at a temperature between about 200 degrees Celsius and about 500 degrees Celsius; for about 10 minutes to about 30 minutes. In a particular embodiment, the calcination temperature ranges between about 300 degrees Celsius and about 450 degrees Celsius.

According to this embodiment, the amorphous alumina is then treated in an aqueous medium at a temperature above the boiling temperature of the aqueous medium. In one embodiment, the amorphous alumina may be immersed in boiling water. In another embodiment, steam-treatment of the amorphous alumina may be performed, for example by exposing the amorphous alumina to steam for a period of time. After being dried, the alumina may be heat-treated at a temperature greater than about 400 degrees Celsius—usually for more than about 10 minutes. Following the heat-treatment, the microstructure of the alumina changes, and porosity and roughness usually increase. The amorphous alumina is transformed to a mesoporous alumina form, and thereby forms the alumina carrier. The increase in porosity and roughness depends on the exposure time of the amorphous alumina to the aqueous medium above its boiling point. In one embodiment, the exposure time may range from about 5 seconds to about 500 seconds. In certain embodiments, exposure for about 10 seconds to about 30 seconds is desirable. Finally, the catalytic active element (mentioned above, e.g., a metal such as silver) is combined with the mesoporous alumina.

As mentioned previously, in some cases, the catalytic active element may be combined with a "dawsonite derivative", e.g., an intermediate material formed from dawsonite itself. In other words, the catalytic active element may be introduced at any stage of forming mesoporous alumina from dawsonite. In one embodiment, the dawsonite derivative includes a mesoporous form of alumina (also, referred to as "mesoporous alumina"). The method for forming the catalyst composition by combining the catalytic active element with the mesoporous alumina was described above.

Figure 2:
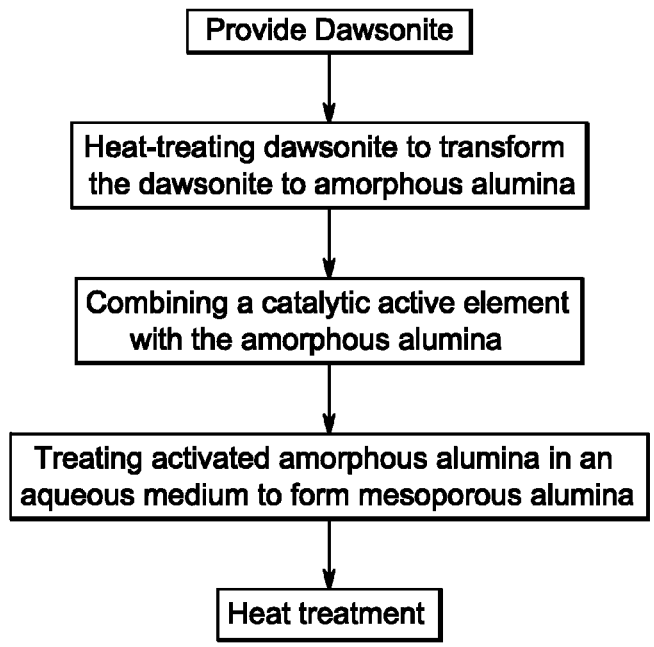
FIG. 2 is a flow diagram for making a catalyst composition, according to another embodiment of the invention.

In another embodiment, the dawsonite derivative is in the form of an amorphous alumina. FIG. 2 illustrates such an embodiment. The dawsonite is first heat-treated to transform the dawsonite to an amorphous alumina. The catalytic active element (e.g., silver) is then combined with the amorphous alumina to form a catalytic active element-activated amorphous alumina. The activated amorphous alumina can then be treated in an aqueous medium, followed by a heat-treatment as described above, to finally form the desired catalyst composition.

Quite generally, in the interest of brevity of the discussions herein, the catalytic active element-activated dawsonite or alumina material may be referred to as the "activated dawsonite", or the "activated alumina material", respectively.

"Combining" as used herein, refers to impregnating, disposing, doping, distributing, substituting, or mixing the catalytic active element with a dawsonite or dawsonite derivative. The catalytic active element may be combined with a carrier by at least two ways: by surface reaction or by doping. The surface reaction may be a chemical reaction occurring at an exposed surface through adsorption. The strong interaction between an adsorbate and the surface creates an electronic bond, depending on the reactive chemical species involved. Impregnation, distribution, disposition and mixing lead to surface reaction.

"Doping" refers to substituting a substance with an element, for example substituting dawsonite with a catalytic active element. In the case of crystalline substances, the atoms of a dopant commonly take the place of elements that were in the crystal lattice of the material. In some embodiments, the catalytic active element is substituted or doped within the dawsonite to form a catalytic active element-substituted dawsonite. A cation of the dawsonite is typically exchanged with the catalytic active element. Synthesis of a metal-substituted dawsonite is described, for example, in an article entitled "Reconstruction of dawsonite by alumina carbonation in $(NH_4)_2CO_3$: Requisites and mechanism" by Georgiana Stoica et. al., Chem. Mater. 2008, 20, 3973-3982, which is incorporated herein with reference.

Figure 3:
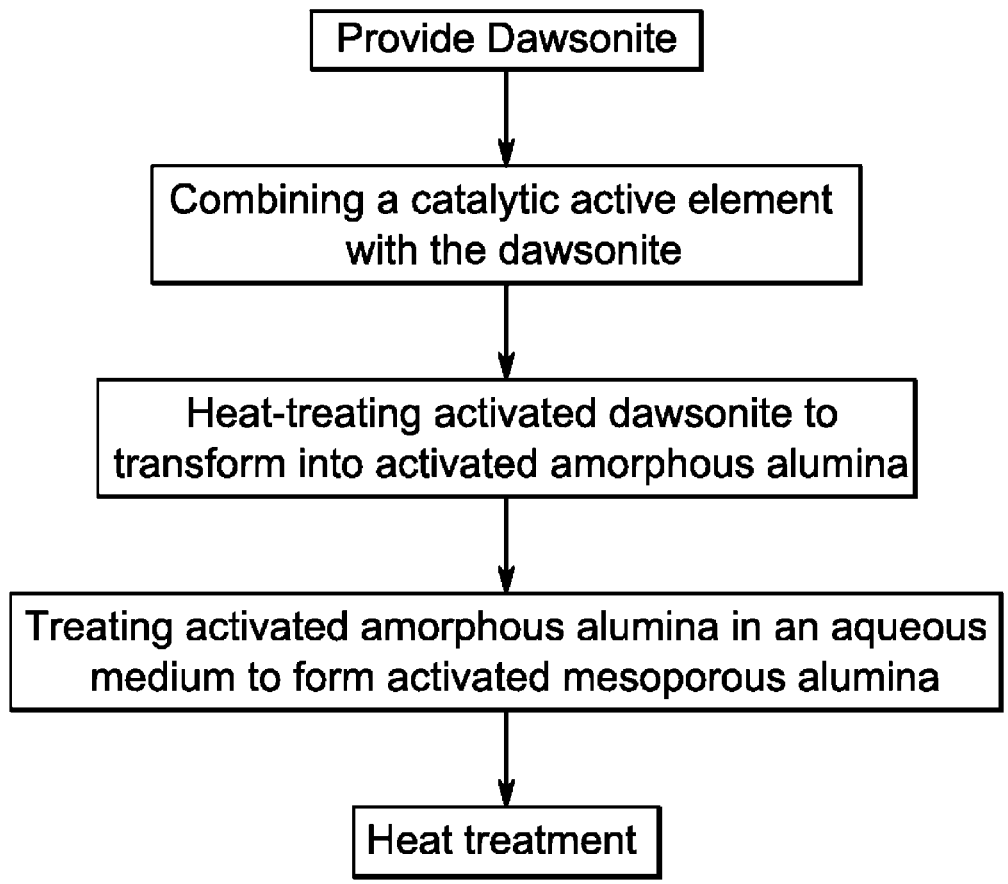
FIG. 3 is a flow diagram for making a catalyst composition, according to yet another embodiment of the invention.

FIG. 3 illustrates another alternative method for forming the catalyst composition. Here, the dawsonite is first combined with the catalytic active element (e.g., silver), to form an activated dawsonite material. In some particular embodiments, the activated dawsonite includes the catalytic active element-substituted dawsonite, as discussed above. The activated (or substituted) dawsonite is then subjected to the heat-treatment step; and the aqueous-treatment step, as discussed in the above embodiments, to transform the activated dawsonite to activated mesoporous alumina, so as to form the desired catalyst composition.

Suitable catalytic active elements for these embodiments may include transition metal elements. Examples of suitable catalytic active elements include platinum, gold, silver, and combinations thereof. In a particular embodiment, the catalytic active element comprises silver. Other suitable catalytic active elements may include gallium, indium, rhodium, palladium, ruthenium, iridium, and various combinations thereof. The catalytic active element is usually present in an amount that is at least about 3 weight percent, based on a total weight of the alumina carrier. In some embodiments, the amount of the catalytic active elements ranges from about 3 weight percent to about 10 weight percent, and in some particular embodiments, from about 5 weight percent to about 8 weight percent of the alumina carrier.

The catalyst composition formed in the various embodiments set forth above is typically disposed on a substrate, to form a catalyst coating or layer. The substrate is typically a monolith, functioning as a support structure for the catalyst composition. The substrate may be formed from various materials, including metals, ceramics, or a combination thereof. Suitable metals may include copper, steel, aluminum, iron, and combinations thereof. Examples of suitable ceramics include cordierite, alumina, mullite, aluminum titanate, silicon carbide, and stabilized zirconia. Other suitable materials for the substrate may include fused silica, activated carbon, or zeolite. Cordierite is magnesium aluminum cyclosilicate. Zeolite, as used herein, may include hydrated aluminosilicates, such as analcime, chabazite, heulandite, natrolite, phillipsite, and stilbite. Mullite, as used herein, is a form of aluminum silicate. Suitable materials may include those with a relatively low thermal expansion, to withstand thermal shocks.

The substrate is of a predesigned geometry to maximize the exposed area of the catalyst composition that is coated thereon. Usually, the substrate is substantially porous, to facilitate the attachment of the catalyst composition. Typically, the porous substrate has hollow shapes with specific cross sections containing internal wall structures on which the layer is coated.

The catalyst composition may be applied to the substrate by any suitable technique, such as washcoating, dip coating and flow coating. For the application of such a coating, a material powder can be mixed with a solvent to form a slurry or a sol. Suitable solvents for forming the slurry include protic fluids, e.g., water and/or a short chain alcohol, where the carbon count is less than about 20 carbon atoms per hydroxyl group. Suitable short chain alcohols may include methanol, ethanol, iso-propanol, 1-butanol, 2-butanol, iso-butanol, and t-butanol. In one embodiment, washcoating is an especially suitable technique. The parameters used for applying the coating by the washcoating process depend in part on the selected substrate and solvent used in the slurry.

The catalyst coating in oxide form may be present in an amount greater than about 100 grams/liter of the monolith substrate. The volume of the substrate is measured as the external geometric volume. A preferred level for the catalyst coating is sometimes between about 150 grams/liter and about 300 grams/liter.

In some embodiments, the dawsonite may be first disposed on the substrate; and then processed to transform the dawsonite to mesoporous alumina, i.e., the catalyst composition. The catalytic active element can be combined with the dawsonite layer or the dawsonite derivative layer. In these embodiments, the dawsonite layer can be formed by using the techniques as discussed above.

The resulting catalyst composition may be characterized in terms of its purity, surface area, pore size and distribution. In some embodiments, the catalyst composition has pores with diameters between about 2 nanometers and about 50 nanometers, and about 90 percent of the pores are greater than 10 nanometers. The surface area usually ranges from about 10 $m^2$/gram to about 1000 $m^2$/gram, and in certain embodiments, from about 200 $m^2$/gram to about 500 $m^2$/gram. In a particular embodiment, the surface area is between about 300 $m^2$/gram and about 450 $m^2$/gram.

Thus, the present method advantageously provides catalyst compositions of high surface area and improved morphology. The morphology of the catalyst composition can be engineered to attain the required surface area, pore size and distribution. A desired morphology can be achieved by controlling the dawsonite phase and carrying out several method steps, at controlled temperatures and atmosphere. The resulting catalysts often have high NOx reduction capabilities at low temperatures (e.g., less than about 300 degrees Celsius). Moreover, the present method is a relatively economic process to produce NOx catalysts, as compared to currently available methods that can involve more complex steps.

The above-described method for making a catalyst composition can be very easily exploited for use on an industrial production line.

EXAMPLES

The example that follows is merely illustrative, and should not be construed to be any sort of limitation on the scope of the claimed invention.

Example 1

150 grams of ammonium dawsonite (Taimei Chemicals Co., Ltd) was first calcined at about 400 degrees Celsius for about 10 minutes, at heating and cooling rates of about 5K/min in step (a). The dawsonite was transformed to amorphous alumina after calcination. In step (b), the amorphous alumina was then exposed to steam for about 30 seconds. After being dried, and calcined at about 400 degrees Celsius for about 10 minutes, a mesoporous alumina was obtained. The surface area of the mesoporous alumina, obtained by a BET analyzer, was about 420 $m^2$/gram. 20 grams of the mesoporous alumina powder was then milled with silver nitrate (amounting to 2% of silver by weight/weight of alumina) in water at a pH of about 3, to form a slurry. A cordierite monolith was dip coated with the slurry. The coated monolith was dried, and the dip coating was repeated 3 times, to build up the coating weight to 120 gms/liter, followed by calcination to about 500 degrees Celsius for about 3 hours.

Another embodiment of this invention is directed to processes for reducing NOx emissions in an exhaust stream or other type of gas stream. This type of objective, and related details, are described in many references, such as U.S. Patent Application 2008/0070778 (Castellano et al), which is incorporated herein by reference. As one non-limiting example, the process could involve treatment of the exhaust stream by an SCR technique, as described above. Regardless of the particular technique, the catalyst composition that is employed would be one prepared as described herein, i.e., combination of dawsonite or a dawsonite derivative with a catalytic active element.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for making a catalyst composition, comprising the steps of combining dawsonite or a dawsonite derivative with a catalytic active element.

2. The method of claim 1, wherein the dawsonite derivative comprises amorphous alumina or mesoporous alumina.

3. The method of claim 2, wherein the dawsonite derivative is formed by heat treating the dawsonite under conditions sufficient to calcine the dawsonite and convert the dawsonite to amorphous alumina.

4. The method of claim 3, wherein the heat treatment is carried out at a temperature in a range of about 300 degrees Celsius to about 600 degrees Celsius.

5. The method of claim 3, further comprising an aqueous treatment of the amorphous alumina, wherein the amorphous alumina is treated in an aqueous medium at a temperature above the boiling point of the aqueous medium, so as to convert the amorphous alumina to a mesoporous form.

6. The method of claim 5, wherein the aqueous treatment comprises immersing the amorphous alumina in boiling water.

7. The method of claim 5, wherein the aqueous treatment comprises steam treatment of the amorphous alumina.

8. The method of claim 1, further comprising the following steps after forming an activated dawsonite material by combining the dawsonite with the catalytic active element;
(a) heat treating the activated dawsonite material under conditions sufficient to calcinate the activated dawsonite material and convert the activated dawsonite material to an activated amorphous alumina material; and
(b) treating the activated amorphous alumina material in an aqueous medium at a temperature above the boiling point of the aqueous medium, so as to convert the amorphous alumina material to a mesoporous form.

9. The method of claim 8, wherein the heat treatment is carried out at a temperature in a range of about 300 degrees Celsius to about 600 degrees Celsius.

10. The method of claim 8, wherein treating the activated amorphous alumina material in the aqueous medium comprises immersing the activated amorphous alumina in boiling water.

11. The method of claim 8, wherein treating the activated amorphous alumina material in the aqueous medium comprises steam treatment of the activated amorphous alumina.

12. The method of claim 1, wherein combining dawsonite or the dawsonite derivative with the catalytic active element comprises impregnating or disposing the catalytic active element on at least one surface of the dawsonite or the dawsonite derivative.

13. The method of claim 1, wherein combining dawsonite or the dawsonite derivative with the catalytic active element comprises doping the dawsonite or the dawsonite derivative with the catalytic active element.

14. The method of claim 13, wherein doping comprises exchanging the catalytic active element with a cation of the dawsonite.

15. The method of claim 1, wherein the catalytic active element comprises gallium, indium, rhodium, palladium, ruthenium, iridium, or combinations thereof.

16. The method of claim 1, wherein the catalytic active element comprises a transition metal selected from the group consisting of silver, platinum and gold.

17. The method of claim 1, wherein the catalytic active element is present in an amount of at least about 3 weight percent, based on the total weight of the catalyst composition.

18. The method of claim 1, further comprising heat treatment of the catalyst composition under conditions sufficient to calcine the catalyst composition.

19. The method of claim 1, further comprising disposing the catalyst composition on a monolithic substrate.

20. The method of claim 1, wherein the catalyst composition has a surface area in a range of about 200 $m^2$/gm to about 500 $m^2$/gm.

21. The method of claim 20, wherein the catalyst composition has a surface area in a range of about 300 $m^2$/gm to about 450 $m^2$/gm.

22. A method for making a catalyst composition for reducing nitrogen oxides, comprising the steps of:
(a) heat treating dawsonite under conditions sufficient to convert the dawsonite to an amorphous alumina;
(b) treating the amorphous alumina in an aqueous medium at a temperature above the boiling point of the aqueous medium, so as to convert the amorphous alumina to a mesoporous alumina; and
(c) combining a catalytic active element with the mesoporous alumina, to form the catalyst composition.

23. A method for making a catalyst composition for reducing nitrogen oxides, comprising the steps of:
(a) heat treating dawsonite under conditions sufficient to calcine the dawsonite and convert dawsonite to an amorphous alumina,
(b) combining a catalytic active element with the amorphous alumina to form a catalytic active element-activated amorphous alumina, and
(c) treating the catalytic active element-activated amorphous alumina in an aqueous medium at a temperature above the boiling point of the aqueous medium, so as to convert the catalytic active element-activated amorphous alumina to a catalytic active element-activated mesoporous alumina, to form the catalyst composition.

24. A method for making a catalyst composition for reducing nitrogen oxides, comprising the steps of:
(a) combining a catalytic active element with dawsonite to form a catalytic active element-activated dawsonite,
(b) heat treating the catalytic active element-activated dawsonite under conditions sufficient to calcine the dawsonite and convert the catalytic active element-activated dawsonite to a catalytic active element-activated amorphous alumina; and
(c) treating the catalytic active element-activated amorphous alumina in an aqueous medium at a temperature above the boiling point of the aqueous medium, so as to convert the catalytic active element-activated amorphous alumina to a catalytic active element-activated mesoporous alumina, to form the catalyst composition.

* * * * *